Patented Apr. 28, 1953

2,636,901

UNITED STATES PATENT OFFICE 2,636,901

PROCESS FOR REDUCTION OF NITROOLEFINS

John B. Tindall, Terre Haute, Ind., assignor to Commercial Solvents Corporation, Terre Haute, Ind., a corporation of Maryland No Drawing. Application May 11, 1949,
Serial No. 92,731

12 Claims. (Cl. 260—570.8)

My invention relates to a novel method for the reduction of nitroolefins. More particularly, it is concerned with a procedure for the catalytic reduction of nitroolefins in the liquid phase to produce the corresponding ketones and amines, with the amines being produced in predominant amounts. Nitroolefins which may be satisfactorily reduced in accordance with the process of my invention are represented by the following general structural formula:

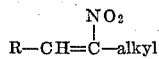

in which R may be either alkyl or aryl.

This case is a continuation-in-part application of my application, U. S. Serial No. 563,096, filed November 11, 1944.

Nitroolefins of the above general type have previously been reduced in accordance with a variety of procedures, some of which have involved electrolytic reduction; reduction with nascent hydrogen, i. e., utilization of mixtures such as iron and hydrochloride acid; reduction with molecular hydrogen in the presence of noble metal catalyst and a mineral acid, etc. While all of the aforementioned methods can be utilized for the reduction of nitroolefins, none of them is free from certain material disadvantages. For example, with procedures involving electrolytic reduction, the yields of the desired products are quite low. Certain of the methods are capable of reducing only specific types of nitroolefins included by the above general formula while still other procedures involving the use of noble metal catalysts and mineral acids, although rather effective, have two marked disadvantages from the standpoint of their commercial application, i. e., the type of catalyst required for such procedures is very expensive and the presence of mineral acids in the hydrogenation apparatus presents serious corrosion problems. Furthermore, although catalytic reduction has been effected in accordance with the procedure just mentioned, no one, to my knowledge, has ever been able to reduce nitroolefins successfully in the presence of a nickel catalyst. In all prior attempts of which I am aware certain bimolecular compounds and/or intractable polymeric materials were obtained.

It is an object of my invention to provide a method for reducing nitroolefins of the above type which is readily adaptable to commercial production and which is capable of giving a comparatively high total yield of amines and ketones.

It is a further object of my invention to provide a process for the reduction of such nitroolefins whereby the reaction may be conveniently controlled to produce the corresponding amine in predominant amounts. The reaction may also be controlled to produce the corresponding ketone in predominating amounts according to the procedure described in my co-pending application, U. S. Serial No. 92,732, filed of even date herewith.

Other objects will be apparent from the description which follows:

I have now discovered that the above and other objects may be accomplished by subjecting nitroolefins of the aforesaid type to the action of molecular hydrogen in the presence of Raney nickel catalyst and an organic acid. In accordance with my invention, a mixture comprising the desired nitroolefin, Raney nickel catalyst, and an organic acid is charged to a suitable hydrogenation apparatus and subjected to a hydrogen pressure ranging from 500 to 2000 pounds at temperatures of between 30 and 100° C. Suitable organic solvents may also be used in the reaction medium if desired.

The above reduction is effected in a substantially anhydrous medium if the amine is to be produced in predominating amounts over the ketones. I have found that such object may be realized by the utilization of an organic solvent medium which is maintained in an anhydrous condition or at least which is initially anhydrous. The latter limitation is mentioned because of the fact that the reaction involved, i. e., reduction of a nitroolefin to the corresponding amine, of necessity, results in the liberation of varying amounts of water, and, therefore, as the reduction proceeds, the concentration of water in the reaction mixture increases. While, as may be inferred from the above, the presence of water in the reaction mixture is undesirable, when the amine is the preferred product, such water of reaction does not appreciably interfere with the procurement of amine in predominating amounts.

Also, it may be mentioned in this connection that another factor tending to influence the final composition of the reduction mixture is the strength of the acid utilized. If a small amount of water is present in the reaction medium and a preponderance of the amine is desired, I have found that this object can be realized by utilizing organic acids having dissociation constants not substantially higher than that of acetic acid, $1.86 \times 10^{-5}$. If the reaction medium is substantially anhydrous, however, any organic acid having an ionization constant between about $1.4 \times 10^{-5}$ and $1.1 \times 10^{-3}$ can be used. Examples of organic acids which can be used to give a preponderance of amines, even in the presence of very small amounts of water, are acetic, propionic, butyric, valeric, and the like. Examples of organic acids which can be used to give a preponderance of amines when the reaction medium is anhydrous include lactic, tartaric, formic, and the like, in addition to those listed above. The quantity of acid employed can vary, and has been found to be not particularly critical, with the exception that at least about one mole of acid should be used for each mole of nitroolefin to be reduced. The term "organic acid" as applied to my invention does not include the halogen derivatives of the organic acids such as chlor propionic, brom propionic, and the like even though some of such derivatives have dissociation constants within the range specified, due to the harmful effect of the halogen on the catalyst.

From the above it can be seen that several variables affect the proportion of amine formed in relation to ketone. Thus amine formation is favored by the substantial absence of water, and by weak acid conditions. The latter can be controlled either by using a weak organic acid in the medium or a weak or a stronger acid in the absence of a solvent in which it can ionize.

The explanation for the effect of these variables probably lies in the nature of the reaction involved, although I do not wish to be limited to any particular theory of operation. I have found that when nitroolefins are reduced in accordance with my invention, the first reaction occurring is the formation of hydroxylamines. It is understood, however, that simultaneously with this reaction small quantities of nitroolefins are also reduced directly to form the amine. Upon further reduction, the hydroxylamine is rearranged to form an oxime. It is at this stage that the conditions mentioned above either favor the formation of a ketone or an amine. Whether the ketone or amine is then formed in predominating amounts depends upon whether or not the reaction conditions favor hydrolysis of the oxime. If the conditions do not favor hydrolysis of the oximes to form ketones, the oxime is, upon further reduction, converted into the corresponding amine. Accordingly, therefore, if the medium contains a strong organic acid (an organic acid with a dissociation constant between about $1.86 \times 10^{-5}$ and $1.1 \times 10^{-3}$) such an acid, when dissolved in an inert solvent in which it can ionize, tends to cause hydrolysis of the oxime to give a greater proportion of ketone. Likewise, if a weaker acid is used in the medium, and sufficient water is present to cause the weak acid to become very active by ionization, hydrolysis is favored with an accompanying increase in ketone production. The converse of the variables is also true; that is, if a weak acid is used, or a strong acid in the absence of water, a predominant amount of the amine is formed. It is understood, however, that amine formation is favored even though a strong acid is used, provided there is no solvent (either water or organic solvent) present in which the acid may ionize.

Some amines are always formed during the reduction, even under conditions most favorable to hydrolysis, partly because the nitroolefin can be reduced directly to the amine, and partly because some of the oxime is reduced to the amine even under the adverse conditions. Likewise, some ketone is always formed, even under conditions adverse thereto, because sufficient water is liberated during the reaction to cause at least a small portion of the acid to ionize, thus causing hydrolysis of a small portion of the oxime to ketone.

If the reduction of the nitroolefins is carried out in the absence of an organic acid, under either neutral or basic conditions, the yields of both amines and ketones are substantially reduced. The presence of the organic acid is necessary in order to eliminate or minimize the formation of undesirable condensation products, which otherwise will be produced in predominating amounts. Inorganic acids cannot be used in my process due to their tendency to poison the Raney nickel catalyst.

Nitroolefins which are satisfactorily reduced in accordance with my invention are represented by the following general structural formula:

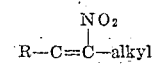

in which R is either alkyl or aryl. Examples of nitroolefins coming within the above formula, which can be reduced according to my invention, include, 1-phenyl-2-nitro-1-butene, 1-(p-isopropylphenyl)-2-nitropropene, 1-(m-tolyl)-2-nitro-propene, 2-nitro-2-hexene, 1-phenyl-2-nitro-1-propene, 4-phenyl-2-nitro-2-pentene, 1-(p-methoxyphenyl)-2-nitropropene.

Solvents suitable for use in the medium in my process include a wide variety of organic solvents. Any organic solvent which is inert to the reactants and products at the conditions employed is satisfactory for use in my process. Examples of solvents coming within the above definition include a wide variety of alcohols, ethers, esters, acids and hydrocarbons, such as methanol, ethanol, propanol, ethyl ether, propyl ether, ethyl hexyl ether, methyl acetate, ethyl formate, amyl acetate, hexadecane, and the like.

If a substantially water-insoluble solvent is used, even in the absence of water other than that formed by the reaction, the ketone is produced in larger quantities than is the amine.

When the reaction appears to be complete, the reduction mixture is withdrawn from the hydrogenation apparatus and the crude product refined by various methods, depending on the initial composition of the reaction mixture used. In general, the reaction mixture is acidified with hydrochloric acid or sulfuric acid and the extraneous materials removed by distillation. The non-basic oil is then separated from the residue by extraction with benzene or a similar solvent and the resultant extract distilled to recover the ketone. The amine, which is present in the aqueous portion of the reaction mixture in the form of its inorganic salt, is liberated by the addition of a suitable base such as sodium hydroxide. The amine thus liberated is then removed from the aqueous mixture by extraction with benzene and the benzene extract fractionally distilled to obtain the substantially pure amine. In certain instances, it may be found desirable to separate the amine from the aforesaid alkaline aqueous mixture by steam distillation.

My invention may be further illustrated by the following specific examples.

EXAMPLE I

A mixture consisting of 250 g. (1.53 mols) of 1-phenyl-2-nitro-1-propene, 85 cc. (1.48 equivalents) of acetic acid, 600 cc. of methanol and 20 g. of Raney nickel catalyst was placed in a rocking bomb hydrogenation unit and reduced at 1000 pounds pressure at a temperature which varied from 40 to 100° C. The reaction required three hours for completion. At the end of this period, the product was filtered and treated with a solution of 45 cc. of sulfuric acid and 1000 cc. of water. The resultant mixture was then distilled through a fractionating column, in order to remove acetic acid and excess methanol in the form of methyl acetate. Distillation was continued until the oily-appearing liquid ceased to come over. The oil layer thus obtained consisted of phenylacetone and amounted to 9.8 g. corresponding to a yield of 4.7% based on the 1-phenyl-2-nitro-1-propene used. The residue from the distillation was decanted off and made alkaline with sodium hydroxide. An oil layer formed on the addition of the base and was separated. The remaining water layer was then extracted with benzene and the combined oil layer and benzene extracts were fractionated. After the water and benzene had been removed, 124.1 g. of 2-amino-1-phenyl-propane, boiling at 105° C. (35 mm.) was obtained. This yield corresponded to 60% of the theoretical.

EXAMPLE II

A mixture consisting of 123 g. of 2-nitro-2-hexene, 60 cc. of acetic acid, 700 cc. of methanol and 20 g. of Raney nickel catalyst was placed in a rocking bomb hydrogenation unit and reduced at 1000 pounds pressure at temperature which varied from 30 to 82° C. The reaction required three hours for completion. At the end of the reduction, the product was filtered and 90 cc. of hydrochloric acid added. The mixture was then distilled, taking off methyl acetate and excess methanol. After the first methanol fraction had come off, 500 cc. of water was added. Distillation was continued until the oily-appearing liquids stopped coming over. The oily-layer amounted to 29 cc., containing 24.2 g. of 2-hexanone. This corresponded to a yield of 25.3%. To the residue from the distillation was added 60 g. of sodium hydroxide and 200 cc. of water. This mixture was then refluxed until free from the odor of ammonia. Upon further distillation, two layers of the distillate were formed. The water layer dissolved in the oil upon agitation. The total volume of the distillate was 123 cc., containing 50 g. of 2-amino-hexane. This corresponded to a yield of 51.7%.

In the following table, the results of a series of reductions of 2-nitro-1-phenyl-1-propene are given. Each of these reductions was carried out exactly according to the procedure described in Example I except that varying solvents, acids, and quantities of reactants were used.

the art. In general, it may be said that any process involving the reduction of nitroolefins of the aforesaid type to their corresponding amines and ketones in which the amines are produced in predominating amounts, by liquid phase hydrogenation in the presence of Raney nickel catalyst and an organic acid of the type described, lies within the scope of my invention.

I claim:

1. In a process for the reduction of nitroolefins of the type:

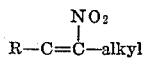

wherein R represents a member selected from the group consisting of alkyl, phenyl, alkyl substituted phenyl and alkoxyphenyl, to produce a mixture of amines and ketones containing a predominant proportion of amines, the improvement which comprises subjecting a mixture consisting of a nitroolefin of the aforesaid type, an inert organic solvent other than a water-insoluble solvent, and an organic carboxylic acid having an ionization constant at 25° C. of between about $1.4 \times 10^{-5}$ and $1.86 \times 10^{-5}$ and less than about 1 mole of water per mole of nitroolefin, to the action of molecular hydrogen in the presence of Raney nickel catalyst at elevated pressure.

2. In a process for the reduction of nitroolefins of the type:

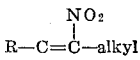

wherein R represents a member selected from the group consisting of alkyl, phenyl, alkyl substituted phenyl and alkoxyphenyl, to produce a mixture of amines and ketones in which the amine is present in predominant amounts, the improvement which comprises subjecting a mixture consisting of a nitroolefin of the aforesaid type, an inert organic solvent other than a water-insoluble solvent, and an organic carboxylic acid having an ionization constant at 25° C. of between about $1.4 \times 10^{-5}$ and $1.86 \times 10^{-5}$ and less than about 1 mole of water per mole of nitroolefin, to the action of molecular hydrogen in the presence of Raney nickel catalyst at temperatures between about 40 and 100° C. and at pressures between about 500 and 2000 pounds per square inch.

3. The process of claim 2 wherein the nitroolefin is 1-phenyl-2-nitro-1-propene.

4. The process of claim 2 wherein the nitroolefin is 2-nitro-2-hexene.

5. The process of claim 2 wherein the nitroolefin is 1-(p-methoxyphenyl)-2-nitropropene.

6. In a process for the reduction of nitroolefins of the type:

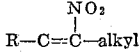

*Table I*

| Run No. | Wt. of Phenyl-Nitro-Propene, Grams | Solvent and Vol., cc. | Acid and Wt., gms. | Yield of Amine (Percent) | Yield of Ketone (Percent) | Total Yield (Percent) |
|---|---|---|---|---|---|---|
| 1 | 200 | Methanol—600 | Acetic—75 | 48.8 | 12.0 | 60.8 |
| 2 | 200 | Butanol—600 | Acetic—70 | 45.2 | 21.0 | 66.2 |
| 3 | 200 | do | Acetic—40 | 22.8 | 8.5 | 31.3 |
| 4 | 200 | do | Acetic—20 | 25.2 | 6.1 | 31.3 |
| 5 | 250 | Methanol—600 | Acetic—85 | 60.0 | 4.7 | 64.7 |
| 6 | 250 | do | do | 59.0 | 3.9 | 62.9 |
| 7 | 200 | Methanol—300 | Formic—60 | 35.6 | 33.2 | 68.8 |
| 8 | 200 | None | Acetic—600 | 44.0 | 24.5 | 68.5 |

It is to be understood, of course, that my invention is not to be construed as limited to the particular examples given above, since numerous variations will readily occur to those skilled in wherein R represents a member selected from the group consisting of alkyl, phenyl, alkyl substituted phenyl and alkoxyphenyl, to produce a mixture of amines and ketones in which the amine is present in predominating amounts, the improvement which comprises subjecting a mixture of a nitroolefin of the aforesaid type and an organic carboxylic acid having an ionization constant at 25° C. of between about $1.4 \times 10^{-5}$ and $1.1 \times 10^{-3}$ to the action of molecular hydrogen in the presence of Raney nickel catalyst at elevated pressures and a temperature of between about 40 and 100° C., said reduction being carried out in the substantial absence of water other than that formed by said reduction.

7. In a process for the reduction of nitroolefins of the type:

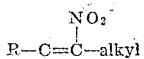

wherein R represents a member selected from the group consisting of alkyl, phenyl, alkyl substituted phenyl and alkoxyphenyl, to produce a mixture of amines and ketones in which the amine is present in predominating amounts, the improvement which comprises subjecting a mixture containing a nitroolefin of the aforesaid type, an inert organic solvent other than a water-insoluble solvent, an organic carboxylic acid having an ionization constant at 25° C. between about $1.4 \times 10^{-5}$ and $1.86 \times 10^{-5}$ and less than about one mol of water per mol of nitroolefin, to the action of molecular hydrogen in the presence of Raney nickel catalyst at elevated pressures and at temperatures between about 40 and 100° C.

8. In a process for the reduction of nitroolefins of the type:

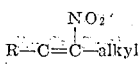

wherein R represents a member selected from the group consisting of alkyl, phenyl, alkyl substituted phenyl and alkoxyphenyl to produce a mixture of amines and ketones containing a predominant proportion of amines, the improvement which comprises subjecting a nitroolefin of the aforesaid type to the action of molecular hydrogen in the presence of Raney nickel catalyst at elevated pressures and in the presence of an inert organic solvent other than a water-insoluble solvent and of an organic carboxylic acid having an ionization constant at 25° C. of between about $1.4 \times 10^{-5}$ and $1.1 \times 10^{-3}$, said reduction being carried out in the absence of water other than that formed by said reduction.

9. In a process for the reduction of nitroolefins of the type:

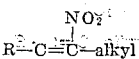

wherein R represents a member selected from the group consisting of alkyl, phenyl, alkyl substituted phenyl and alkoxyphenyl, to produce a mixture of amines and ketones in which the amine is present in predominating amounts, the improvement which comprises subjecting a mixture consisting of a nitroolefin of the aforesaid type, an inert organic solvent other than a water-insoluble solvent, and acetic acid and less than about one mole of water per mole of nitroolefin, to the action of molecular hydrogen in the presence of Raney nickel catalyst at elevated pressures.

10. In a process for the reduction of nitroolefins of the type:

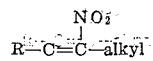

wherein R represents a member selected from the group consisting of alkyl, phenyl, alkyl substituted phenyl and alkoxyphenyl, to produce a mixture of amines and ketones in which the amine is present in predominating amounts, the improvement which comprises subjecting a mixture consisting of a nitroolefin of the aforesaid type, an alcohol solvent, and an organic carboxylic acid having an ionization constant at 25° C. of between about $1.4 \times 10^{-5}$ and $1.1 \times 10^{-3}$, to the action of molecular hydrogen in the presence of Raney nickel catalyst at elevated pressure and at temperatures between about 40 and 100° C., said reduction being carried out in the absence of water other than that formed by said reduction.

11. In a process for the preparation of 1-phenyl-2-aminopropane by the catalytic liquid phase reduction of phenyl nitropropene, the improvement which comprises subjecting a mixture containing phenyl nitropropene, an organic solvent therefor other than a water-insoluble solvent, and acetic acid and less than about one mole of water per mole of nitroolefin, to the action of molecular hydrogen in the presence of Raney nickel catalyst at elevated pressure.

12. In a process for the preparation of 2-aminohexane by the catalytic liquid phase reduction of 2-nitro-2-hexene, the improvement which comprises subjecting a mixture containing 2-nitro-2-hexene, an organic solvent therefor other than a water-insoluble solvent, and acetic acid and less than about one mole of water per mole of nitroolefin to the action of molecular hydrogen in the presence of Raney nickel catalyst at elevated pressure.

JOHN B. TINDALL.

References Cited in the file of this patent

UNITED STATES PATENTS

| Number | Name | Date |
|---|---|---|
| 1,879,003 | Alles | Sept. 27, 1932 |
| 2,233,823 | Susie et al. | Mar. 4, 1941 |
| 2,356,582 | Haffner et al. | Aug. 22, 1944 |
| 2,427,822 | Tindall | Sept. 23, 1947 |

FOREIGN PATENTS

| Number | Country | Date |
|---|---|---|
| 360,266 | Great Britain | Nov. 5, 1931 |
| 406,149 | Germany | Nov. 14, 1924 |

OTHER REFERENCES

Schales et al., "Ber. deut. Chem.," vol. 68, pp. 1579–1591 (1935).

Ser. No. 255,882, Haffner et al. (A. P. C.), published April 20, 1943.